US012021310B2

(12) United States Patent
Park et al.

(10) Patent No.: US 12,021,310 B2
(45) Date of Patent: Jun. 25, 2024

(54) DUAL-BAND DUAL-POLARIZED ANTENNA RADIATION DEVICE

(71) Applicant: MUTRONICS CO., LTD, Anseong-si Gyeonggi-do (KR)

(72) Inventors: Seung-Mo Park, Yongin-si (KR); Soon Woo Choi, Pyeongtaek-si (KR)

(73) Assignee: MUTRONICS CO., LTD, Anseong-Si Gyeonggi-do (KR)

( * ) Notice: Subject to any disclaimer, the term of this patent is extended or adjusted under 35 U.S.C. 154(b) by 153 days.

(21) Appl. No.: 17/950,508

(22) Filed: Sep. 22, 2022

(65) Prior Publication Data

US 2023/0155303 A1 May 18, 2023

(30) Foreign Application Priority Data

Nov. 17, 2021 (KR) ........................ 10-2021-0158409

(51) Int. Cl.
*H01Q 25/00* (2006.01)
*H01Q 13/02* (2006.01)

(52) U.S. Cl.
CPC ....... *H01Q 25/001* (2013.01); *H01Q 13/0233* (2013.01)

(58) Field of Classification Search
CPC .... H01Q 9/044; H01Q 9/0407; H01Q 9/0414; H01Q 9/0457; H01Q 25/001; H01Q 13/0233; H01Q 13/085; H01Q 13/10; H01Q 13/18; H01Q 21/065; H01Q 21/25
See application file for complete search history.

(56) References Cited

U.S. PATENT DOCUMENTS

| | | | | |
|---|---|---|---|---|
| 6,956,528 B2 * | 10/2005 | Lee | H01Q 21/065 343/700 MS |
| 7,450,071 B1 * | 11/2008 | Volman | H01Q 9/0457 343/846 |
| 8,072,384 B2 * | 12/2011 | Morrow | H01Q 21/0025 343/846 |
| 10,892,536 B2 * | 1/2021 | Fan | H01P 1/2005 |
| 2013/0044035 A1 * | 2/2013 | Zhuang | H01Q 9/0428 343/770 |
| 2018/0026378 A1 * | 1/2018 | Hadavy | H01Q 21/0087 343/771 |
| 2020/0076078 A1 * | 3/2020 | Tehran | H01Q 9/045 |
| 2022/0320743 A1 * | 10/2022 | Igarashi | H01Q 21/24 |
| 2023/0155303 A1 * | 5/2023 | Park | H01Q 9/0457 343/702 |

FOREIGN PATENT DOCUMENTS

| | | |
|---|---|---|
| KR | 10-0417493 | 2/2004 |

* cited by examiner

*Primary Examiner* — Jason M Crawford
(74) *Attorney, Agent, or Firm* — KILE PARK REED & HOUTTEMAN PLLC

(57) ABSTRACT

The disclosure relates to an antenna radiation device in which dual band and dual polarization are realized, and according to the disclosure, a high-frequency band antenna radiation device and a low-frequency band antenna radiation device are integrated, and power feeding slot substrates in which a high-frequency power feeding slot, a low-frequency power feeding slot, and a low-frequency radiation slot are formed are stacked, so that a high-frequency signal and a low-frequency signal may be transmitted and received through a single antenna radiation device and dual polarization may be implemented, using electromagnetic wave induction and coupling effects.

6 Claims, 8 Drawing Sheets

DUAL-BAND DUAL-POLARIZED ANTENNA RADIATION DEVICE

CROSS REFERENCE TO RELATED APPLICATION(S)

This application claims priority to and benefits of Korean Patent Application No. 10-2021-0158409 under 35 U.S.C. § 119, filed on Nov. 17, 2021 in the Korean Intellectual Property Office (KIPO), the entire contents of which are incorporated herein by reference.

BACKGROUND

1. Technical Field

The document relates to a dual-band dual-polarized antenna radiation device mainly used for satellite communication, and more particularly, to an antenna radiation device in which dual band and dual polarization are realized by integrating a transmission antenna radiation device and a reception antenna radiation device so as to share a single radiation aperture.

2. Description of the Related Art

With a trend of miniaturization of electronic communication devices, a need for miniaturization of antennas mounted on the electronic communication devices is also increasing. In particular, antennas for satellite communication used in aircraft, unmanned aerial vehicles, vehicles, ships, and the like are generally different in a transmission frequency band and a reception frequency band, and accordingly, a transmission antenna and a reception antenna must be individually configured, and thus, there is a problem in that an overall antenna volume or size is increased because the transmission antenna and the reception antenna are configured as individual substrates (e.g., printed circuit boards (PCBs)). Even when a power feeding line is designed by arranging the transmission antenna and the reception antenna on one substrate or radiation aperture, there are still problems to be improved in dual-band transmission/reception characteristics, polarization characteristics, and wide-range electric beam tilt characteristics.

Korean Patent Publication (Publication No. 10-0417493, "A BROAD-BAND DUAL-POLARIZED MICROSTRIP ARRAY ANTENNA") discloses a technique in which transmission paths for separate linear polarization are placed on different layers to minimize the effect of interference therebetween, and an excitation by a proximity feeding method and an excitation by an aperture coupled method are separately used by respective transmission lines in order to get two separate polarizations. However, the above publication relates to a single-band dual-polarized antenna of a single beam and does not disclose a technique for dual-band transmission and reception in addition to the dual polarization on the same substrate.

SUMMARY

The disclosure relates to an antenna radiation device for satellite communication, and is directed to minimizing the size of the antenna radiation device so that a transmission antenna and a reception antenna are arranged to share a radiation aperture, and simultaneously, improving dual-band and dual-polarized characteristics.

An aspect of the disclosure provides an antenna radiation device in which dual band and dual polarization may be realized, and the antenna radiation device includes a high-frequency radiation patch configured to transmit or receive a high-frequency electromagnetic wave, a radiation patch dielectric substrate stacked below the high-frequency radiation patch and configured to provide a predetermined radiation spacing distance, a first high-frequency power feeding line provided below the radiation patch dielectric substrate and configured to generate the high-frequency electromagnetic wave, a first radiation ground which is stacked below the first high-frequency power feeding line, and in which a high-frequency power feeding slot is formed and thus the high-frequency electromagnetic wave generated by the first high-frequency power feeding line is coupled thereto, a second radiation ground provided to be spaced apart from the first radiation ground because of a low-frequency radiation slot, disposed to surround the first radiation ground, and configured to transmit or receive a low-frequency electromagnetic wave, a first cavity ground which is stacked below the first radiation ground and the second radiation ground and in which a low-frequency power feeding slot is formed, a second high-frequency power feeding line provided between the first radiation ground and the first cavity ground, and configured to generate a high-frequency electromagnetic wave and induce the high-frequency electromagnetic wave to the first radiation ground, a first low-frequency power feeding line provided below the first cavity ground, and configured to generate a low-frequency electromagnetic wave and induce the low-frequency electromagnetic wave to the first cavity ground, a second cavity ground provided below the first low-frequency power feeding line and configured to provide a space in which the low-frequency electromagnetic wave is isolated, and a second low-frequency power feeding line provided below the second cavity ground, and configured to generate a low-frequency electromagnetic wave and induce the low-frequency electromagnetic wave to the second cavity ground. Accordingly, the antenna radiation device may transmit/receive a dual-band double-polarization signal in a structure with a minimized size.

According to the disclosure, the size of a single antenna radiation device can be minimized, and at the same time, a function of transmitting and receiving dual-band signals of low frequency/high frequency and dual-polarization signals of vertical polarization/horizontal polarization can be provided.

Further, according to the disclosure, vertical/horizontal dual-polarization can be coupled to a power divider with a phase difference of 90° to realize a circular polarization.

DETAILED DESCRIPTION OF THE EMBODIMENTS

Figure 1:
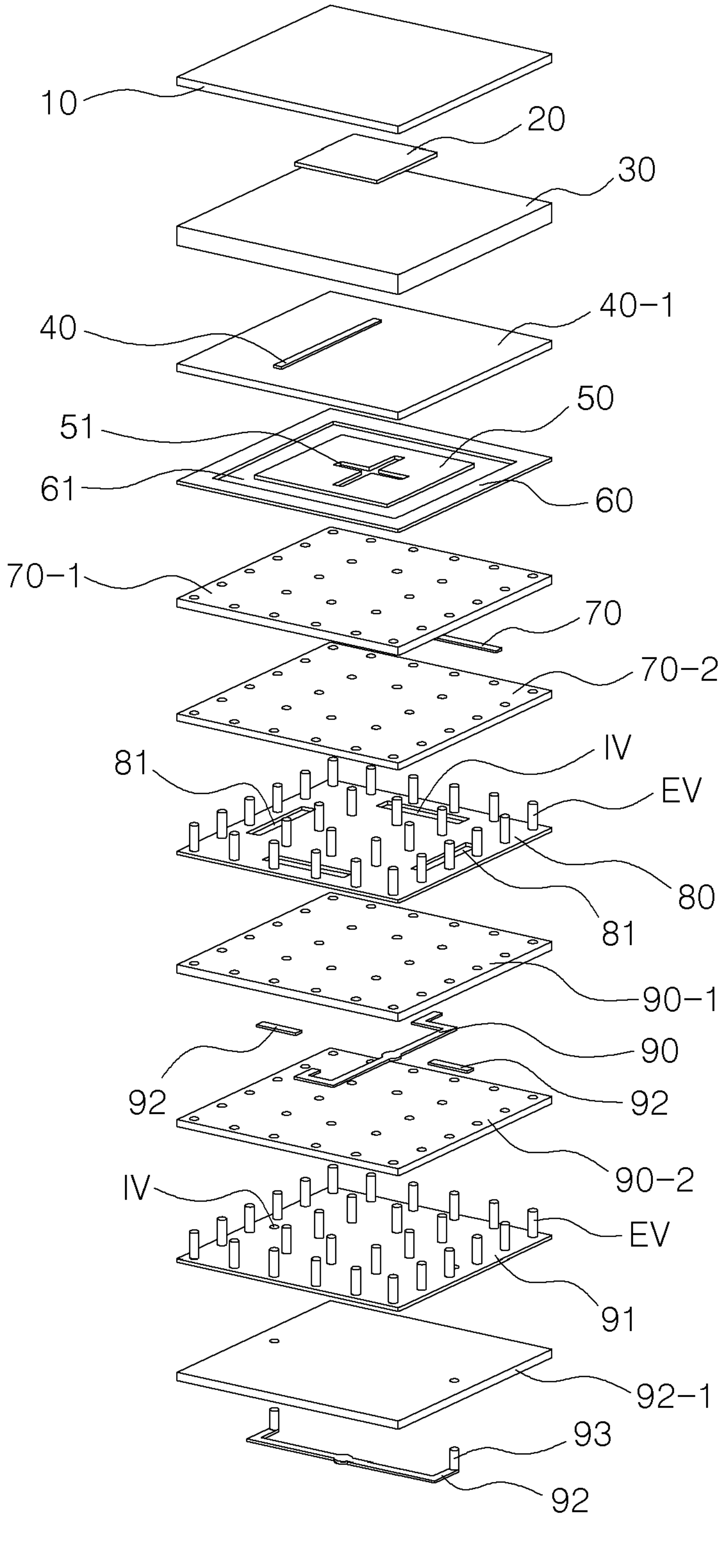
FIG. 1 is a schematic exploded view for describing each component of a dual-band dual-polarized antenna radiation device according to an embodiment.

Hereinafter, the disclosure will be described in detail so that those skilled in the art can easily understand and reproduce the disclosure through the preferred embodiments described with reference to the accompanying drawings. In the following description of the disclosure, when it is determined that detailed descriptions of related well-known functions or configurations unnecessarily obscure the gist of the embodiments of the disclosure, the detailed descriptions thereof will be omitted. Since terms used throughout the specification are defined in consideration of functions in the embodiments of the disclosure and may be sufficiently modified according to the intentions of the user or operator and customs, such terms should be defined on the basis of contents throughout the specification.

Further, the foregoing and additional aspects of the invention will be apparent through the following embodiments. While the configurations of the selectively described aspects or selectively described herein are shown in a single integrated configuration in the drawings, it is understood that they may be freely combined with each other as long as they are not technically inconsistent with common technical knowledge of those skilled in the art.

Therefore, the embodiments described herein and illustrated in the configuration of the disclosure are the most preferred embodiments and are not representative of the full the technical spirit of the disclosure, and thus it should be understood that various equivalents and modifications may be substituted for them at the time of filing the application.

Figure 2:
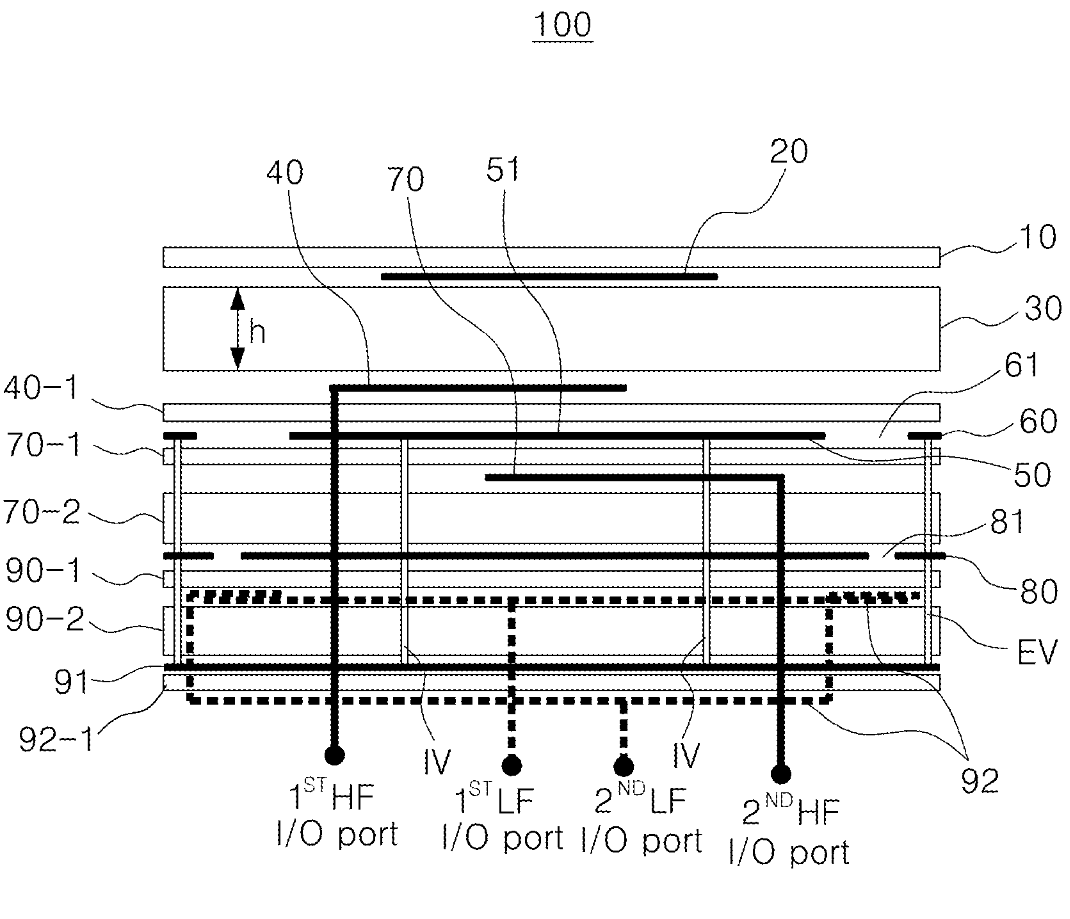
FIG. 2 is a schematic side view for describing a cross section of the dual-band dual-polarized antenna radiation device in which each component according to an embodiment is stacked and coupled.

FIG. 1 is a schematic exploded view for describing each component of a dual-band dual-polarized antenna radiation device according to an embodiment, and FIG. 2 is a schematic side view for describing a cross section of the dual-band dual-polarized antenna radiation device in which each component according to an embodiment is stacked and coupled.

As shown in the drawings, a dual-band dual-polarized antenna radiation device 100 includes a radome 10, a high-frequency radiation patch 20, a radiation patch dielectric substrate 30, a first high-frequency power feeding line 40, a first radiation ground 50, a second radiation ground 60, a second high-frequency power feeding line 70, a first cavity ground 80, a first low-frequency power feeding line 90, a second cavity ground 91, a second low-frequency power feeding line 92, and dielectric substrates 40-1, 70-1, 70-2, 90-1, 90-2, and 92-1, and may transmit and receive high-frequency and low-frequency electromagnetic waves (signals).

The antenna radiation device of FIGS. 1 and 2 may include a dielectric printed circuit board (PCB).

The high-frequency radiation patch 20, the first high-frequency power feeding line 40, the first radiation ground 50, the second radiation ground 60, the second high-frequency power feeding line 70, the first cavity ground 80, the first low-frequency power feeding line 90, the second cavity ground 91, and the second low-frequency power feeding line 92 may all be formed of a copper film pattern.

A high-frequency power feeding slot 51 formed in the first radiation ground 50 and a low-frequency radiation slot 61 formed in the second radiation ground 60 may be formed by etching and removing a copper film.

The high frequency may refer to a frequency range of about 26.5 to about 40 GHz (Ka band), and the low frequency may refer to a frequency range of about 17 to about 26.5 GHz (K band).

The radome 10 may perform a cover function of physically or chemically protecting the antenna radiation device.

The high-frequency radiation antenna may have a structure that operates as a dual-band aperture-coupled cavity-backed patch antenna.

The high-frequency radiation patch 20 may transmit or receive high-frequency electromagnetic waves. The high-frequency radiation patch 20 may be formed of a patterned copper film to transmit or receive high-frequency electromagnetic waves (signals). The high-frequency electromagnetic waves may be transmission signals and may also be reception signals.

The high-frequency radiation patch 20 may be disposed above the first radiation ground 50 to be spaced apart therefrom due to the radiation patch dielectric substrate 30 having a predetermined thickness, and may allow high-frequency electromagnetic waves (signals) to be resonated between the high-frequency radiation patch 20 and the first radiation ground 50 and radiated into the air.

The radiation patch dielectric substrate 30 may be stacked below the high-frequency radiation patch 20 and may provide a predetermined radiation spacing distance h. The radiation patch dielectric substrate 30 may use a dielectric having a high dielectric constant as an insulator, so that the size of the antenna radiation device may be minimized. By appropriately adjusting a thickness h of the radiation patch dielectric substrate 30, a radiation distance between the high-frequency radiation patch 20 and the first radiation ground 50 may be adjusted. Air or honeycomb may be used in the radiation patch dielectric substrate 30.

The first high-frequency power feeding line 40 may be provided below the radiation patch dielectric substrate 30, and may generate high-frequency electromagnetic waves. The first high-frequency power feeding line 40 may be disposed on the dielectric substrate 40-1, and as the first high-frequency power feeding line 40 further includes a via form, a first high-frequency (HF) input/output (I/O) port ($1^{ST}$ HF I/O port) may be disposed by vertically passing through lower layers. Vias may be disposed within a length range of about λ/2 (λ: wavelength), and may be disposed so that an interval between the vias is about λ/8 or less.

The first radiation ground 50 may serve as an antenna ground for radiating high-frequency waves, and the first cavity ground 80 may be provided below the first radiation ground 50 with the dielectric substrates 70-1 and 70-2 interposed therebetween. The second high-frequency power feeding line 70 may be horizontally disposed between the dielectric substrates 70-1 and 70-2, and as the second high-frequency power feeding line 70 further includes a via form, a $2^{ND}$ HF I/O port may be disposed by vertically passing through a plurality of lower layers.

Each of the first radiation ground 50 and the first cavity ground 80 may be formed in a square shape, of which a side has a length of about λ/2 (λ: wavelength of a high-frequency wave) and connected to a plurality of internal vias, and may have an inner space serving as a high-frequency cavity.

An interval of the vias may be less than about λ/8. Since the vias are used to block electromagnetic waves, the vias may be replaced by a metal wall. The vias may be divided into internal vias IV positioned inside and external vias EV positioned outside.

The high-frequency power feeding slot 51 may be provided at a central portion of the first radiation ground 50 and supplies electromagnetic waves through the first high-frequency power feeding line 40 thereabove and the second high-frequency power feeding line 70 therebelow, so that induced electromagnetic waves are coupled to the high-frequency power feeding slot 51. In order to implement dual polarization, the high-frequency power feeding slot 51 may have a cross shape.

Some of the electromagnetic waves coupled to the high-frequency power feeding slot 51 resonate with the high-frequency radiation patch 20 thereabove to be primarily radiated into the air (free space), the remaining electromagnetic waves enter the cavity therebelow and are delayed by half a wavelength in the cavity, and then are secondarily radiated to the air through the high-frequency power feeding slot 51. When phases of the primarily radiated electromagnetic wave, which is coupled to and resonates with the radiation patch 20 in the high-frequency power feeding slot 51, and the secondarily radiated electromagnetic wave, which is delayed by half a wavelength inside the cavity and coupled through the high-frequency power feeding slot 51, are in phase, antenna radiation efficiency is maximized without loss, and to this end, the size of the cavity may be determined so that each of lateral and longitudinal lengths with respect to the high-frequency power feeding slot 51 is about half a wavelength (λ/2).

The radiation patch dielectric substrate 30 may be stacked with a predetermined spacing distance h between the high-frequency radiation patch 20 thereabove and the first radiation ground 50 therebelow, and may serve to determine an antenna resonance frequency and an operating bandwidth.

The first high-frequency power feeding line 40 and the second high-frequency power feeding line 70 may each supply either horizontal polarization (or about +45° polarization) or vertical polarization (or about −45° polarization). The first high-frequency power feeding line 40 and the second high-frequency power feeding line 70 may be disposed by being vertically separated with the first radiation ground 50 interposed therebetween to improve polarization isolation between the two polarizations. The first high-frequency power feeding line 40 and the second high-frequency power feeding line 70 may be micro-strip line or strip-line type transmission line structures, characteristic impedance of the transmission line may be determined according to the thickness and dielectric constant of each of the dielectric substrates 30, 40-1, 70-1, and 70-2, and the width and length of the transmission line may be varied so that input impedance is matched with the characteristic impedance. Since the first high-frequency power feeding line 40 and the second high-frequency power feeding line 70 are provided as described above, dual polarization, such as horizontal polarization and vertical polarization, may all be realized.

A low-frequency antenna is a structure that operates as a dual-band aperture-coupled cavity-backed ring slot antenna, and an operation principle thereof may be similar to that of a high-frequency antenna. The low-frequency antenna and the high-frequency antenna are different in that the high-frequency antenna uses the radiation patch 20, whereas the low-frequency antenna uses the radiation slot 61 instead of the radiation patch.

The low-frequency radiation slot 61 may have a shape of a square- (or circular-) ring slot in which a copper plate is etched between the first radiation ground 50 and the second radiation ground 60. The first radiation ground 50 and the second radiation ground 60, in which the low-frequency radiation slot 61 is formed, may be connected to the first cavity ground 80 and the vias therebelow.

At this time, the first radiation ground 50 may be connected to the internal vias IV and the second radiation ground 60 may be connected to the external vias EV. A rectangular path may be formed between the internal vias and the external vias and this path may serve as a radiation cavity in which the low-frequency radiation slot 61 is positioned. An internal rectangular-shaped high-frequency back cavity surrounded by the internal vias is a structure in which a high-frequency wave and a low-frequency wave are electromagnetically isolated due to the internal vias. The first radiation ground 50 and the second radiation ground 60 may be disposed on the same plane and may also be disposed on separate (different) planes.

The second cavity ground 91 may be disposed below the first cavity ground 80 and the first low-frequency power feeding line 90 with two dielectric substrates 90-1 and 90-2 interposed therebetween, and connected to the internal vias and the external vias to form a back cavity. The second cavity ground may be provided below the first low-frequency power feeding line and may provide a space (back cavity) in which low-frequency electromagnetic waves are isolated.

The first radiation ground 50, the second radiation ground 60, the first cavity ground 80, and the second cavity ground 91 may be connected to the internal and external vias to form a space (cavity) in which electromagnetic waves are isolated.

Four low-frequency power feeding slots 81 may be formed in the first cavity ground 80 by etching, and two pairs, each pair having two symmetrical slots among the four low-frequency power feeding slots, may each supply either horizontal polarization (or about +45° polarization) or vertical polarization (or about −45° polarization).

The first low-frequency power feeding line 90 of a strip-line structure, which includes a 1×2 power divider, is disposed between two dielectric substrates 90-1 and 90-2 to supply a horizontal-polarization (or about +45° polarization) or vertical-polarization (or about −45° polarization) electromagnetic wave to a pair of low-frequency power feeding slots 81.

The second low-frequency power feeding line 92 may be provided from the same plane as the first low-frequency power feeding line to a lower portion of the second cavity ground. The second low-frequency power feeding line 92 may be coupled to another pair of low-frequency power feeding slots 81 on the same plane as the first low-frequency power feeding line 90, and may be connected to the 1×2 power divider of a microstrip-line structure, which is disposed in the dielectric substrate 92-1 placed below the second cavity ground 91, through low-frequency power feeding vias 93 to supply second vertical polarization (or about −45° polarization) or horizontal polarization (or about +45° polarization) different from the polarization that is because of the first low-frequency power feeding line 90. The first low-frequency power feeding line 90 and the second low-frequency power feeding line 92 are disposed by being vertically separated from each other with the second cavity ground 91 interposed therebetween, so that the polarization isolation between two polarizations may be improved.

When electromagnetic waves are supplied to the low-frequency power feeding slot 81 through the first low-frequency power feeding line 90 and the second low-frequency power feeding line 92, some electromagnetic waves are primarily resonated in the (radiation) cavity, which is positioned above the low-frequency power feeding slot 81, in the form of a rectangular path connected to the internal and external vias and primarily radiated into the air through the low-frequency radiation slot 61 by passing through the dielectrics 10, 30, and 40-1 above the low-frequency radiation slot 61. The remaining some electromagnetic waves may enter the back cavity in the form of a rectangular path connected to the internal and external vias below the low-frequency power feeding slot 81, and then are secondarily radiated through the low-frequency power feeding slot 81 after being delayed about half a wavelength.

Like the high-frequency antenna, phases of the primarily radiated electromagnetic wave and the secondarily radiated electromagnetic wave may be in phase, so that radiation efficiency is maximized without loss, and thus the internal and external vias connecting the first cavity ground 80 and the second cavity ground 91 may be disposed at positions of about λ/4 (λ: wavelength of a low-frequency wave) on both sides about the low-frequency power feeding slot 81. A compact arrangement is required when used for the purpose of configuring an array antenna, and thus, the external vias may be positioned close to the low-frequency power feeding slot 81 and the internal vias may be positioned at about λ/4 (λ: wavelength of a low-frequency wave) from the low-frequency power feeding slot 81.

The interval between the vias may be less than ⅛ of a wavelength (λ/8). Since the vias are used to block electromagnetic waves, the vias may be replaced by a metal wall.

As the first low-frequency power feeding line 90 and the second low-frequency power feeding line 92 are provided as described above, dual polarization, such as horizontal polarization (or about +45° polarization) or vertical polarization (or about −45° polarization), may be realized.

A variety of input/output terminals (I/O ports) may be provided below the dual-band dual-polarized antenna device 100.

Figure 3A:
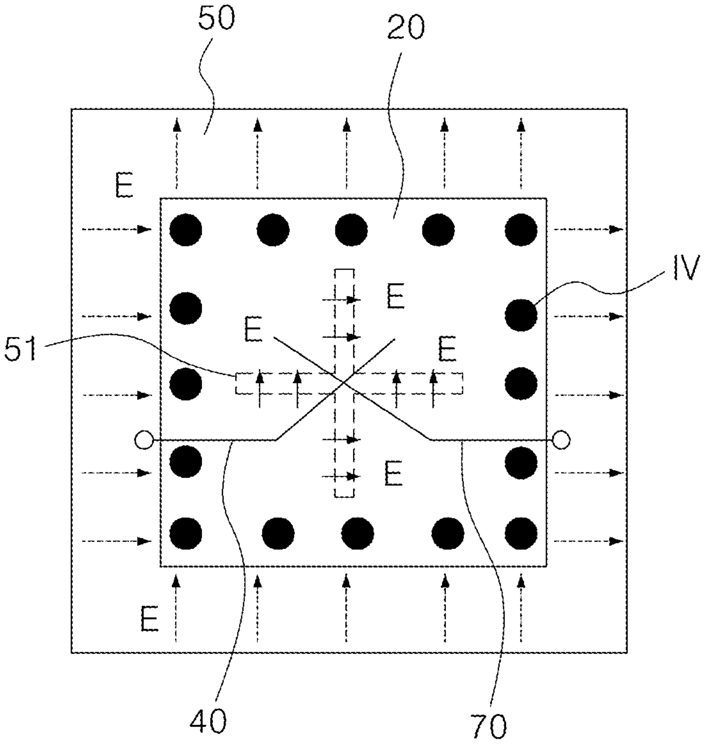
FIG. 3A is a schematic top view for describing an arrangement of high-frequency power feeding lines and a 45° polarization power feeding operation according to an embodiment.
Figure 3B:
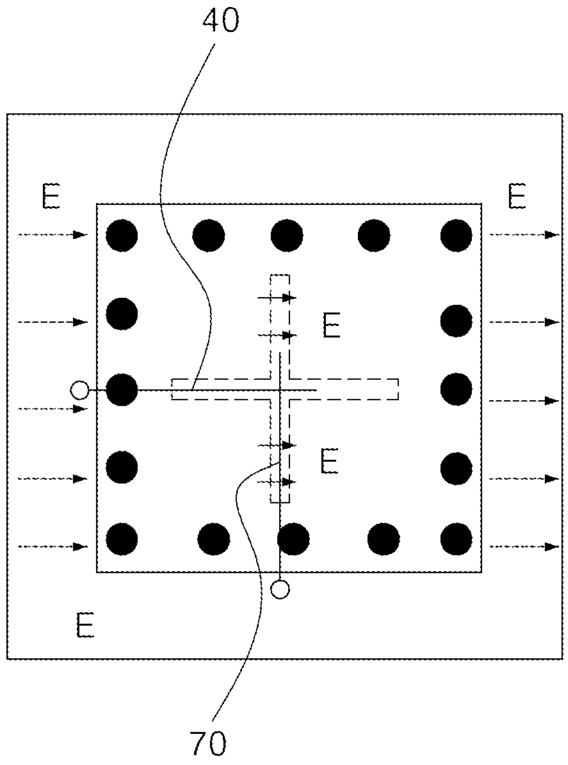
FIG. 3B is a schematic top view for describing the arrangement of high-frequency power feeding lines and a vertical/horizontal polarization power feeding operation according to an embodiment.

FIG. 3A is a schematic top view for describing an arrangement of high-frequency power feeding lines and a 45° polarization power feeding operation according to an embodiment, and FIG. 3B is a schematic top view for describing the arrangement of high-frequency power feeding lines and a vertical/horizontal polarization power feeding operation according to an embodiment.

As shown in the drawings, the radiation patch 20 may be provided above the first radiation ground 50 in which the cross-shaped high-frequency power feeding slot 51 is formed with a predetermined radiation spacing distance from the first radiation ground 50, and the first high-frequency power feeding line 40 and the second high-frequency power feeding line 70 may be respectively provided above and below the first radiation ground 50. Here, the first radiation ground 50 serves as an antenna radiation ground.

The first high-frequency power feeding line 40 and the second high-frequency power feeding line 70 may each be disposed to cross the high-frequency power feeding slot 51 at an angle of about 45° as shown in FIG. 3A, and may also be respectively disposed in horizontal and vertical directions as shown in FIG. 3B.

Arrows in FIGS. 3A and 3B represent electric fields as vectors when electromagnetic waves are radiated from a radiation aperture, as an example when the electromagnetic waves are input to the first high-frequency power feeding line 40. FIG. 3A illustrates that about +45° polarization is formed by adding vectors of the vertical polarization and the horizontal polarization, and FIG. 3B illustrates that the horizontal polarization is formed. The arrangement of the power feeding lines as shown in FIG. 3A may mean that an antenna radiating about +45° and about −45° polarizations is realized, and the arrangement of the power feeding lines as shown in FIG. 3B means that an antenna radiating horizontal and vertical polarizations is realized.

Accordingly, high-frequency electromagnetic waves input through the first high-frequency power feeding line 40 and the second high-frequency power feeding line 70 may be coupled to the high-frequency power feeding slot 51, and the coupled high-frequency electromagnetic waves may be resonated in the space between the first radiation ground 50 and the radiation patch 20 to be radiated. The first high-frequency power feeding line 40 and the second high-frequency power feeding line 70 may provide electromagnetic waves with different polarizations. For example, the first high-frequency power feeding line 40 may provide a horizontal polarization signal, and the second high-frequency power feeding line 70 may provide a vertical polarization signal. The first high-frequency power feeding line 40 and the second high-frequency power feeding line 70 may be disposed by being vertically separated with the first radiation ground 50 interposed therebetween, so that polarization isolation of electromagnetic waves between the polarizations due to the power feeding lines may be improved.

Figure 4A:
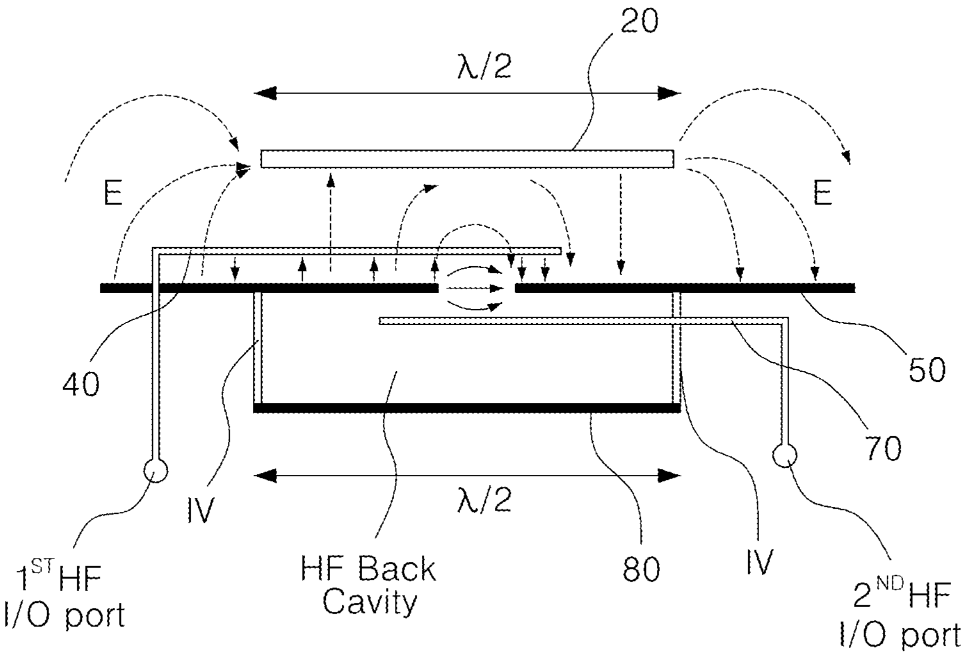
FIG. 4A is a schematic view for describing the principle of primary radiation in which some high-frequency electromagnetic waves coupled to a high-frequency power feeding slot resonate with a first radiation ground and a radiation patch.
Figure 4B:
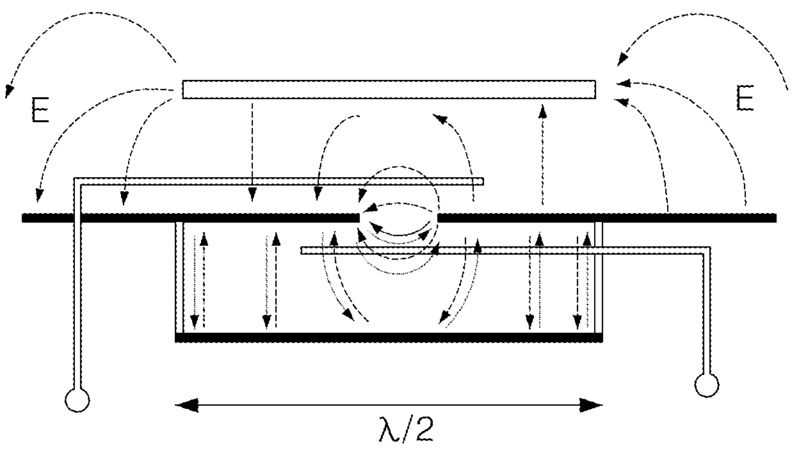
FIG. 4B is a schematic view for describing the principle that remaining some electromagnetic waves coupled to a high-frequency power feeding slot are input into a high-frequency cavity therebelow and secondarily radiated through the high-frequency power feeding slot after being delayed by half a wavelength.

FIG. 4A is a schematic view for describing the principle of first radiation in which some high-frequency electromagnetic waves coupled to the high-frequency power feeding slot 51 resonate with the first radiation ground 50 and the radiation patch 20, and FIG. 4B is a schematic view for describing the principle that the remaining some electromagnetic waves coupled to the high-frequency power feeding slot 51 are input into the HF back cavity therebelow and secondarily radiated through the high-frequency power feeding slot 51 after being delayed by half a wavelength.

As shown in FIG. 4A, high-frequency electromagnetic waves may be induced and coupled to the high-frequency power feeding slot 51 of the first radiation ground 50 due to the first high-frequency power feeding line 40. Arrows represent electric fields E of the electromagnetic wave as vectors and may mean the flow of radio frequency (RF) signals. The radiation patch 20 may have a square shape, of which a side may have a length of about λ/2 (λ: wavelength). An interval of left and right internal vias electrically connected to the first radiation ground 50 in a vertical manner may also be about λ/2.

Some electromagnetic waves E that are inductively coupled to the high-frequency power feeding slot 51 may be resonated in the space between the radiation patch 20 and the first radiation ground 50. Accordingly, on both left and right planes, electric field E plans with horizontal vectors of the same direction are formed, so that the radiation is performed. The vertical vector components are cancelled out, and thus the radiation is not performed. This may be expressed as primary radiation.

As shown in FIG. 4B, the remaining some of the electric fields E induced in the first power feeding slot, which acts as an incident electric field into back cavity, are incident on a lower space of the first radiation ground 50, for example, a (high frequency) back cavity, inverted about 180° in phase (i.e. delayed by half a wavelength) at the vias at positions of λ/4 on both sides of the lower space, and returned to the high-frequency power feeding slot by being delayed by half a wavelength, and thus may operate in the same manner as in the radiation principle of FIG. 4A to be radiated by being inverted in phase. This may be expressed as secondary radiation. The secondarily radiated electromagnetic wave is combined with the primarily radiated electromagnetic wave that is input after half a wavelength and in phase therewith to be radiated into the free space.

Figure 5:
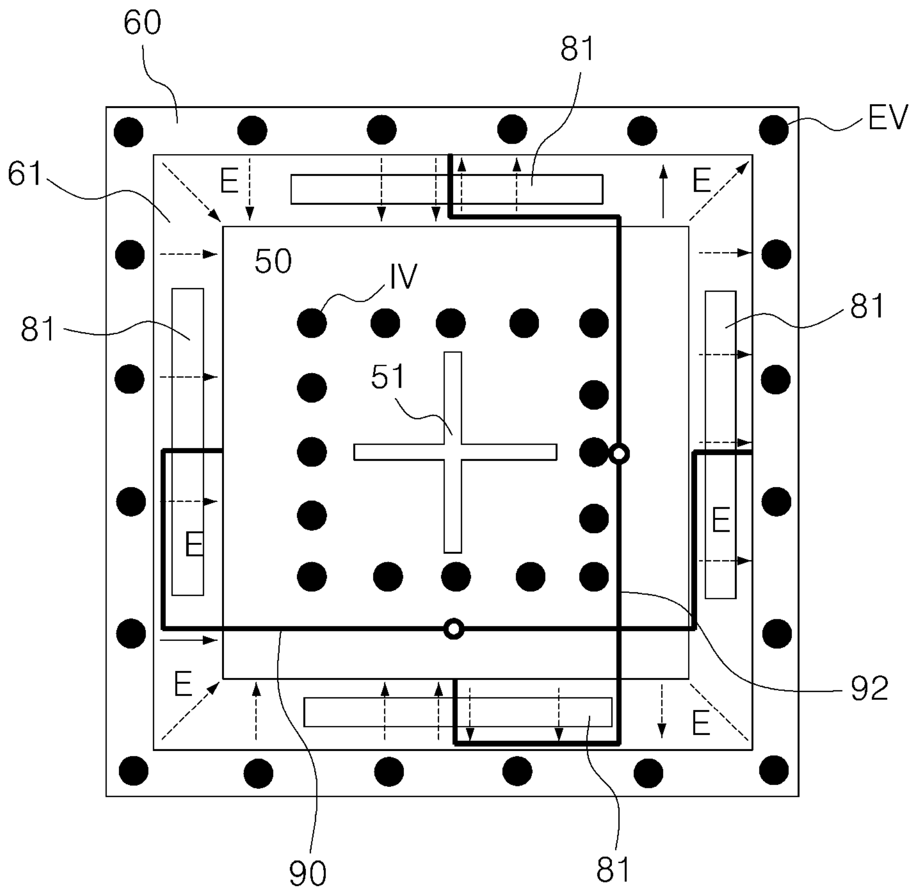
FIG. 5 is a schematic top view for describing the arrangement of low-frequency power feeding lines according to an embodiment.

FIG. 5 is a schematic top view for describing the arrangement of the low-frequency power feeding lines according to an embodiment. As shown in the drawing, the second radiation ground 60 may be provided to be spaced apart from the first radiation ground 50. A rectangular space formed by the second radiation ground 60 and the first radiation ground 50 being spaced apart each other may be the low-frequency radiation slot 61. The second radiation ground 60 and the first radiation ground 50 may be the same plane, and may also be different planes.

The first cavity ground 80 may be stacked below the second radiation ground 60 and the first radiation ground 50, and the low-frequency power feeding slot 81 may be formed therein.

According to an embodiment, the low-frequency power feeding slot 81 may have a rectangular shape, and four (up, down, left, and right) low-frequency power feeding slots 81 may be formed adjacent to the low-frequency radiation slot 61.

The first low-frequency power feeding line 90 may be provided below the low-frequency power feeding slot 81, and low-frequency electromagnetic waves may be input through the first low-frequency power feeding line 90 to supply the low-frequency electromagnetic waves with horizontal polarization to the low-frequency power feeding slot 81. The first low-frequency power feeding line 90 may include a 1×2 power division circuit and supply low-frequency electromagnetic waves of the same phase and the same intensity to two left-and-right low-frequency power feeding slots 81.

The second low-frequency power feeding line 92 may be provided below the low-frequency power feeding slot 81, and low-frequency electromagnetic waves may be input through the second low-frequency power feeding line 92 to supply the low-frequency electromagnetic waves with vertical polarization to the low-frequency power feeding slot 81. The second low-frequency power feeding line 92 may also include a 1×2 power division circuit and supply low-frequency electromagnetic waves of the same phase and the same intensity to two up-and-down low-frequency power feeding slots 81. Accordingly, dual polarization radiation may be realized.

The first low-frequency power feeding line 90 and the second low-frequency power feeding line 92 are disposed by being vertically separated from each other with the second cavity ground 91 interposed therebetween, so that the polarization isolation between two polarizations may be improved.

Dotted arrows represent electric fields E as vectors, in which low-frequency electromagnetic waves of the same phase and the same intensity are supplied to two left-and-right low-frequency power feeding slots 81 through the 1×2 the power division circuit of the first low-frequency power feeding line 90 to induce electromagnetic waves with horizontal polarization to the low-frequency radiation slot 61.

It is meant that, in left and right sides of the inside of the rectangular ring-shaped low-frequency radiation slot 61, the electric fields E of the same horizontal vector may be induced and a horizontal polarization component is radiated. On the other hand, it is meant that, in upper and lower sides of the inside of the rectangular ring-shaped low-frequency radiation slot 61, the electric fields E of opposite vectors are induced, and the electromagnetic waves of vertical polarization components are cancelled out, and thus the radiation is not performed. The low-frequency radiation slot 61 may have a rectangular ring shape, and may also have a circular ring shape. The low-frequency radiation slot 61 may be formed of four slots separated from each other.

The internal and external vias below the rectangular ring-shaped low-frequency radiation slot 61 block electromagnetic waves from the high-frequency power feeding slot 51, so that polarization isolation between the high frequency and the low frequency may be improved. An interval between the internal vias (holes) may be less than about ⅛ of a wavelength (about λ/8), and since the vias are used to block electromagnetic waves, the vias may be replaced with a metal wall. Similarly, an interval between the external vias (holes) may also be less than about ⅛ of a wavelength (about λ/8), and the external vias may also be replaced with a metal wall.

Figure 6:
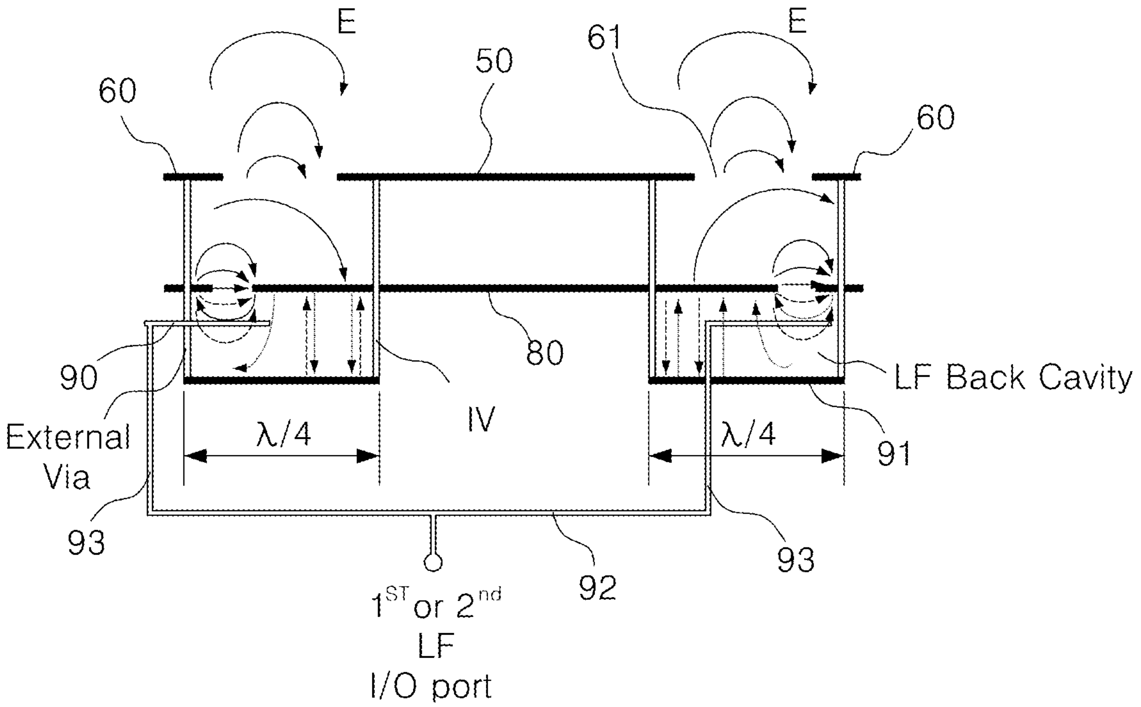
FIG. 6 is a schematic view for describing the principle of horizontal polarization radiation of low-frequency electromagnetic waves according to an embodiment.

FIG. 6 is a schematic view for describing the principle of horizontal polarization radiation of low-frequency electromagnetic waves, according to an embodiment. FIG. 6 is a view for describing FIG. 5 from a side. As shown in the drawing, when electromagnetic waves are input to a low-frequency (LF) I/O port ($1^{ST}$ or $2^{nd}$ LF I/O port), the electromagnetic waves pass through the first or second low-frequency power feeding line 90 or 92, so that low-frequency electromagnetic waves E of the same phase and the same intensity are coupled to left and right sides of the low-frequency power feeding slot 81.

In the same concept as the content of the high-frequency radiation process described above with reference to FIG. 3A and FIG. 3B, some of the low-frequency electromagnetic waves coupled to the low-frequency power feeding slot 81 of FIG. 6 are primarily radiated into the free space through the low-frequency radiation slot 61 above the low-frequency power feeding slot 81, and the remaining some thereof may enter the LF back cavity therebelow to be coupled to the low-frequency power feeding slot after being delayed by about half a wavelength. The electromagnetic waves that are input after half a wavelength through the first or second low-frequency power feeding line 90 or 92 and in phase and combined with the low-frequency electromagnetic wave may be secondarily radiated to the free space through the low-frequency radiation slot 61 above the first or second low-frequency power feeding line 90 or 92.

The electromagnetic waves of horizontal polarization characteristics are induced with the same horizontal vector component in the left and right low-frequency radiation slots 61 to form a radiation aperture having the same horizontal vector on both left and right sides of the first radiation ground 50 and the second radiation ground 60, which are antenna radiation grounds, so that horizontal polarization radiation into the free space may be performed.

When the horizontal polarization radiation is performed by the first low-frequency power feeding line 90, vertical polarization radiation may be performed by the second low-frequency power feeding line 92.

According to an embodiment, as shown in the drawing, the (low-frequency) back cavity positioned below the low-frequency power feeding slot may be formed in the form of a rectangular path connected to the internal and external vias vertically connecting the first cavity ground 80 and the second cavity ground 91. An interval between the internal via and the external via may be an interval of about λ/4 on both sides about the low-frequency power feeding slot 81, or may also be an interval of about λ/4 on a side about the low-frequency power feeding slot 81.

In the case of an electric beam tilt antenna requiring wide-range beam steering, a small arrangement interval is required, and thus it is essential to miniaturize the antenna in order to be applied to such applications. In order to miniaturize the antenna, as shown in FIG. 6, the external vias may be disposed close to the low-frequency power feeding slot 81, and only the internal vias may be disposed such that an interval about λ/4 is maintained from a center of the low-frequency power feeding slot 81.

A low-frequency band antenna that radiates waves through the low-frequency radiation slot 61 may be operated as a transmission or reception antenna. For example, when the high-frequency antenna using the high-frequency radiation patch 20 operates as a transmission (Tx) antenna, the low-frequency antenna using the low-frequency radiation slot 61 may operate as a reception (Rx) antenna.

Figure 7:
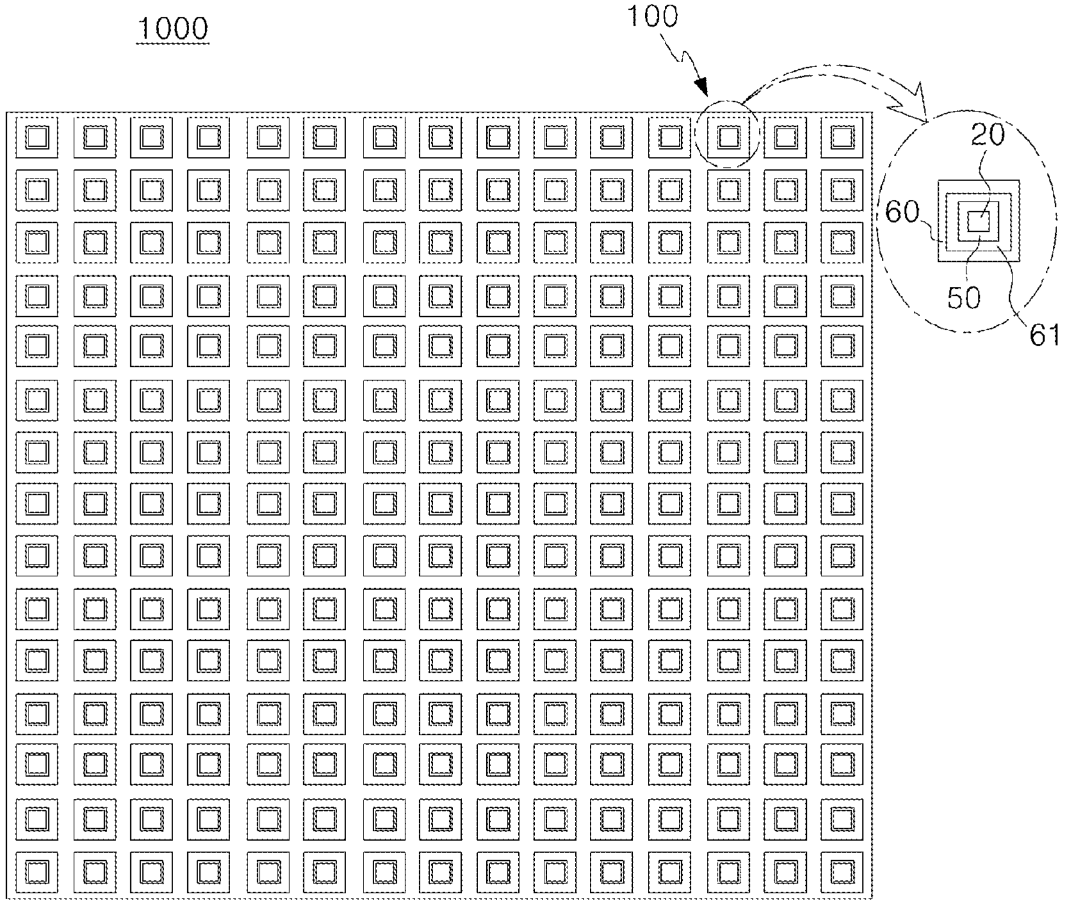
FIG. 7 is a schematic view for describing an antenna radiation device array configured by arranging antenna radiation devices.

FIG. 7 is a schematic view for describing an array antenna configured by arranging a plurality of antenna devices. As shown in the drawing, an antenna array 1000 may include a plurality of antenna devices 100.

Referring to an enlarged part, each of the antenna devices 100 is a dual-band dual-polarized radiation device composed of the high-frequency radiation patch 20 and the low-frequency radiation slot 61. A high-frequency antenna may be a patch antenna in which the high-frequency radiation patch 20 is disposed above the first radiation ground 50, and a low-frequency antenna is a slot antenna in which the low-frequency radiation slot 61 is disposed in a rectangular ring shape between the first radiation ground 50 and the second radiation ground 60. Antenna radiation grounds are the first radiation ground 50 and the second radiation ground 60, and the first radiation ground 50 is a high-frequency antenna radiation ground.

The plurality of integrally configured antenna devices 100 may be arranged in a matrix of N*N on a substrate.

The plurality of antenna devices 100 may be arranged in an array of N*N, and FIG. 7 illustrates an array of 15×15.

All of the plurality of antenna devices may have the same shape and size. The single antenna device 100 may all have the radiation patch 20, the radiation grounds 50 and 60, and the low-frequency radiation slot 61 configured in the same shape and size, so that excellent polarization or tilt characteristics may be maintained.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An antenna radiation device comprising:

a high-frequency radiation patch configured to transmit or receive a high-frequency electromagnetic wave;

a radiation patch dielectric substrate stacked below the high-frequency radiation patch and configured to provide a predetermined radiation spacing distance;

a first high-frequency power feeding line provided below the radiation patch dielectric substrate and configured to generate the high-frequency electromagnetic wave;

a first radiation ground which is stacked below the first high-frequency power feeding line, and in which a high-frequency power feeding slot is formed and thus the high-frequency electromagnetic wave generated by the first high-frequency power feeding line is coupled thereto;

a second radiation ground provided to be spaced apart from the first radiation ground due to a low-frequency radiation slot, disposed to surround the first radiation ground, and configured to transmit or receive a low-frequency electromagnetic wave;

a first cavity ground which is stacked below the first radiation ground and the second radiation ground and in which a low-frequency power feeding slot is formed;

a second high-frequency power feeding line provided between the first radiation ground and the first cavity ground, and configured to generate a high-frequency electromagnetic wave and induce the high-frequency electromagnetic wave to the first radiation ground;

a first low-frequency power feeding line provided below the first cavity ground, and configured to generate a low-frequency electromagnetic wave and induce the low-frequency electromagnetic wave to the first cavity ground;

a second cavity ground provided below the first low-frequency power feeding line and configured to provide a space in which the low-frequency electromagnetic wave is isolated; and a second low-frequency power feeding line provided below the second cavity ground, and configured to generate a low-frequency electromagnetic wave and induce the low-frequency electromagnetic wave to the second cavity ground.

2. The antenna radiation device of claim 1, wherein the second low-frequency power feeding line is provided from the same plane as the first low-frequency power feeding line to a lower portion of the second cavity ground.

3. The antenna radiation device of claim 1, wherein the first high-frequency power feeding line and the second high-frequency power feeding line are disposed in the high-frequency power feeding slot having a cross shape in a horizontal direction and a vertical direction, respectively, or in directions of about +45° and about −45°, and supply dual polarization.

4. The antenna radiation device of claim 1, wherein the low-frequency radiation slot has a rectangular or circular ring shape in which the first radiation ground inside an antenna radiation ground is separated from the second radiation ground outside the antenna radiation ground, and the low-frequency power feeding slot includes four slots that are respectively adjacent to sides of the first cavity ground and formed to be separated from each other.

5. The antenna radiation device of claim 1, wherein the first low-frequency power feeding line and the second low-frequency power feeding line are electrically connected to the first radiation ground and the second radiation ground, respectively.

6. The antenna radiation device of claim 5, wherein the first low-frequency power feeding line and the second low-frequency power feeding line each cross the low-frequency power feeding slot and induce low-frequency electromagnetic waves of the same phase and the same intensity.

* * * * *